United States Patent
Beser

(10) Patent No.: US 8,233,382 B2
(45) Date of Patent: *Jul. 31, 2012

(54) ORDERED SWITCHOVER OF CABLE MODEMS

(75) Inventor: Nurettin Burcak Beser, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/699,234

(22) Filed: Feb. 3, 2010

(65) Prior Publication Data

US 2010/0135152 A1 Jun. 3, 2010

Related U.S. Application Data

(63) Continuation of application No. 10/355,239, filed on Jan. 31, 2003, now Pat. No. 7,684,315.

(60) Provisional application No. 60/424,719, filed on Nov. 8, 2002.

(51) Int. Cl.
*G01R 31/08* (2006.01)
*H04L 12/66* (2006.01)
*H04J 1/02* (2006.01)
*G06F 11/00* (2006.01)
*H04N 7/173* (2011.01)

(52) U.S. Cl. ........ 370/219; 370/242; 370/352; 370/465; 370/489; 714/2; 725/111

(58) Field of Classification Search ........................ None
See application file for complete search history.

(56) References Cited

U.S. PATENT DOCUMENTS

| | | |
|---|---|---|
| 6,173,168 B1 | 1/2001 | Andersson |
| 6,449,250 B1 | 9/2002 | Otani et al. |
| 6,816,500 B1 | 11/2004 | Mannette et al. |
| 6,941,487 B1 | 9/2005 | Balakrishnan et al. |
| 7,080,400 B1 | 7/2006 | Navar |
| 7,085,287 B1 | 8/2006 | Chapman |
| 2002/0065907 A1 | 5/2002 | Cloonan et al. |
| 2002/0066110 A1 | 5/2002 | Cloonan et al. |
| 2004/0034871 A1 | 2/2004 | Lu et al. |
| 2004/0063497 A1 | 4/2004 | Gould |

OTHER PUBLICATIONS

Co-pending U.S. Appl. No. 10/355,239, filed Jan. 31, 2003; Nurettin Burcak Beser entitled "Ordered Switchover of Cable Modems".
"Data-Over-Cable Service Interface Specifications—Radio Frequency Interface Specification SP-RFIv1.1-I08-020301," © Copyright 1999-2002 Cable Television Laboratories, Inc., Mar. 1, 2002, pp. 181-200.
"PacketCable™ Dynamic Quality-of-Service Specification PKT-SP-DQOS-I03-020116," © Copyright 1999-2002 Cable Television Laboratories, Inc., Jan. 16, 2002, pp. 14 and 17.

*Primary Examiner* — Nittaya Juntima
(74) *Attorney, Agent, or Firm* — Harrity & Harrity, LLP

(57) ABSTRACT

A cable modem termination system (CMTS) provides for ordered switchover of the cable modems it serves when a primary module of the CMTS fails. When the primary module in the CMTS fails, a backup module takes over service of the cable modems. The backup module restores the service flows of the cable modems based on a restoration order determined by session recovery priorities that are related to quality of service levels required by the service flows. In particular, service flows that are engaged in VoIP "911" calls are restored first. Service flows engaged in other VoIP calls are next restored. Lastly, service flows engaged in regular data sessions are restored.

20 Claims, 5 Drawing Sheets

ORDERED SWITCHOVER OF CABLE MODEMS

RELATED APPLICATION

This application is a continuation of U.S. application Ser. No. 10/355,239, filed Jan. 31, 2003 now U.S. Pat. No. 7,684, 315, issued Mar. 23, 2010), which claims the benefit of U.S. Provisional Application No. 60/424,719, filed Nov. 8, 2002, the entire contents of both of which are incorporated herein by reference.

BACKGROUND OF THE INVENTION

A. Field of the Invention

The present invention relates generally to network data transmission, and more particularly, to data transmission through cable modem systems.

B. Description of Related Art

Cable modems allow end-users to connect to networks, such as the Internet, through cable TV lines. In a manner similar to traditional telephone modems, cable modems modulate between digital signals from an attached computing device to analog signals that are transmitted over the cable lines. Unlike traditional telephone dial-up modems, however, cable modems may provide significantly greater throughput.

Cable modems are generally installed locally to the end-user, and communicate with a cable modem termination system (CMTS) at a local cable TV company office. Multiple cable modems may share a single communication channel with the CMTS. The cable modems can receive signals from and send signals to the CMTS, but not to other cable modems on the channel.

In addition to providing traditional network data to users, cable modems may provide telephony services to users. VoIP (voice over IP—that is, voice delivered using the Internet Protocol) is a term used in IP telephony for a set of facilities for managing the delivery of voice information using the Internet Protocol. In general, VoIP refers to the sending of voice information in digital form in discrete packets rather than using the traditional circuit-committed protocols of the public switched telephone network (PSTN). Through a cable modem, a cable company may provide VoIP services, in addition to traditional network data, to its end-users.

One issue that arises in VoIP is quality of service (QoS). When a user places a telephone call, the user expects that the connection will remain active and contain sufficient bandwidth throughout the telephone call. In other words, it is generally unacceptable for a telephone call to fade in and out during the course of the call. In contrast, users receiving traditional network data through a cable modem may not notice short data interruptions.

Occasionally, a module in the CMTS that communicates with a number of cable modems may fail. The CMTS may handle the failure by bringing a backup module on-line. The backup module takes over the data flows that the original module was handling. Ideally, the rollover to the backup module should occur without affecting communication sessions with the cable modems. In reality, however, some disruption in service will occur.

There is a need in the art to minimize communication session disruptions to cable modem end-users when bringing backup modules in the CMTS on-line. This is particularly true when VoIP services are involved.

SUMMARY OF THE INVENTION

Systems and methods consistent with the principles of this invention provide for an ordered switchover of data flows of cable modems when a CMTS module fails. The ordering of the switchover is determined based on the QoS level of the data flows being handled by the cable modems.

One aspect consistent with the invention is directed a method that includes communicating with cable modems through service flows initiated between the cable modems and a first module in a CMTS. The method further includes detecting failure of the first module and restoring the service flows between the cable modems and a second module in the CMTS based on a restoration order determined by session recovery priorities that are related to quality of service levels required by the service flows.

A second aspect consistent with the invention is directed to a device that includes a first module configured to communicate with cable modems through a number of service flows established with the cable modems. A control module stores information identifying the service flows established with the cable modems. A second module communicates with the cable modems when the first module fails and restores the service flows from the failed first module that are identified by the stored information. The restored services are performed in a restoration order determined by quality of service levels required by the service flows.

A third aspect consistent with the invention is directed to a system that includes a number of cable modems and a CMTS. The cable modems communicate via service flows, each of the service flows being associated with one of a number of session classes. The session classes include classes that define voice over IP (VoIP) service flows and data service flows. The CMTS includes a first module configured to communicate with the cable modems via the service flows and a second module configured to establish communication with the cable modems when the first module fails by restoring the service flows in a restoration order in which all of the service flows that are VoIP service flows are restored prior to the data service flows.

Yet another aspect consistent with the invention is directed to a method for interfacing a CMTS with cable modems. The method comprises registering the cable modems with the CMTS when the cable modems are first brought on-line by establishing a primary service flow between each of the cable modems and the CMTS, creating additional service flows between the CMTS and the cable modems, storing information describing the service flows, and restoring failed service flows between the cable modems and the CMTS by using the stored information to determine which service flows to restore and performing the restoring in a restoration order determined by quality of service levels required by the service flows.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents.

An ordered switchover of cable modems from a failing module at a CMTS is described herein. Service flows between the cable modems and the backup CMTS module are re-established in a priority order. The priority order is designed to minimize disruptions in service flows that have higher quality of service requirements. Accordingly, service flows serving VoIP sessions are re-established before service flows serving data sessions.

System Overview

Figure 1:
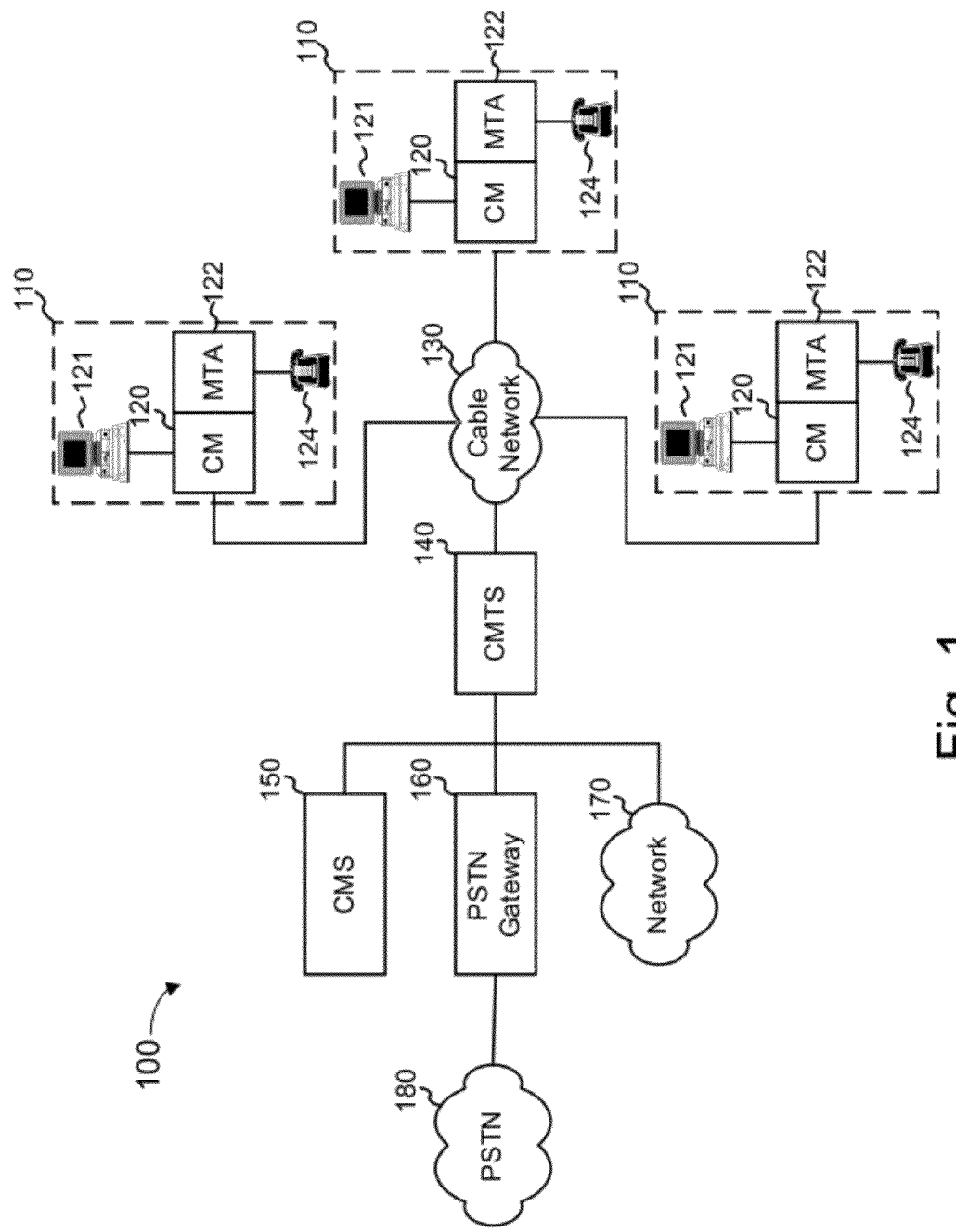
FIG. 1 is a diagram illustrating an exemplary system in which concepts consistent with aspects of the invention may be implemented.

FIG. 1 is a diagram illustrating an exemplary system 100 in which concepts consistent with aspects of the invention may be implemented. System 100 may include a number of end-users 110, a cable network 130 and a cable modem termination system (CMTS) 140. CMTS 140 can connect end-users 110 to a number of networks and/or devices, including a call management system (CMS) 150, a Public Switched Telephone Network (PSTN) gateway 160, and a network 170. PSTN gateway 160 may couple CMTS 140 to a PSTN 180.

End-users 110 may connect to the cable network 130 through cable modems (CMs) 120. Cable modems 120 may allow a user to transmit and receive data over cable network 130. A personal computer 121 may be connected to cable modem 120. The user may, for example, run a web browsing program on personal computer 121, through which the user may view web pages received from servers on network 170. Cable modems 120 may additionally connect to multimedia terminal adapters (MTAs) 122. MTAs 122 may include a conventional telephone jack for connecting telephones 124. MTAs 122 convert audio received from telephones 124 into packetized digital signals, which are then transmitted by cable modems 120 to CMTS 140. Similarly, MTAs 122 receive audio packets from CMTS 140. The MTAs 122 convert the audio packets into analog signals that are received at telephone 124. In this manner, MTAs 122, in conjunction with cable modems 120, provide VoIP telephony services to end-users 110.

Although cable modem 120 and MTA 122 are shown as two separate components, in some implementations, they may be a single integrated unit.

Cable network 130 may include a coaxial or hybrid optical fiber/coaxial (HFC) cable network. Cable modems 120 may interconnect with the cable network 130 via coaxial cable/optical fiber.

CMTS 140 may facilitate communications between cable modems 120 and external networks or devices, such as network 170 and PSTN gateway 160. CMTS 140 may be maintained by a cable company at a facility in relative proximity to end-users 110. CMTS 140 may include a number of upstream (i.e., from the cable modem to the CMTS) channels and downstream (i.e., from the CMTS to the cable modem) channels. The downstream channels may be higher bandwidth channels than the upstream channels. Cable modems 120 transmit data units, called bursts, to CMTS 140 during pre-assigned time slots. CMTS 140 may additionally include a number of modules, such as DOCSIS (data over cable service interface specification) modules. Each module may, for example, interface 16 downstream and four upstream channels with a group of cable modems.

Network 170 may include one or more networks of any type, such as a local area network (LAN), a metropolitan area network (MAN), or a wide area network (WAN). Frequently, network 170 is a WAN such as the Internet. Through network 170, personal computers 121 may communicate with other devices, such as network servers coupled to network 170.

PSTN gateway 160 provides a gateway between VoIP data received at CMTS 140 and PSTN 180. PSTN gateway 160 converts VoIP data received at CMTS 140 into a format suitable for PSTN 180 and correspondingly converts voice data received from PSTN 180 into VoIP data. Although PSTN gateway 160 is shown in FIG. 1 as being directly connected to CMTS 140, in other implementations, CMTS 140 may communicate with PSTN gateway 160 through a packet-based network.

CMS 150 provides VoIP call management services. End-users 110 may initiate VoIP calls by transmitting a call request to CMS 150. Based on the request, CMS 150 may complete the call with the intended called party through either PSTN 180 or, if the called party is connected via a VoIP network, by initiating a packet-based session between the caller and the called party.

Service Flows

Quality of Service (QoS) is an important concept in VoIP communication sessions. As discussed previously, it is desirable to maintain a high QoS level when CMS 150 facilitates a VoIP connection with one of end-users 110. In particular, VoIP communication sessions should be given priority over regular data sessions.

CMTS 140 and cable modems 120 facilitate QoS considerations by communicating with one another using service flows. A service flow is a unidirectional flow of packets that are provided at a particular QoS. When a cable modem 120 initially connects with CMTS 140, cable modem 120 and CMTS 140 set up a primary service flow. The primary service flow is used to transmit maintenance and control information.

Figure 2:
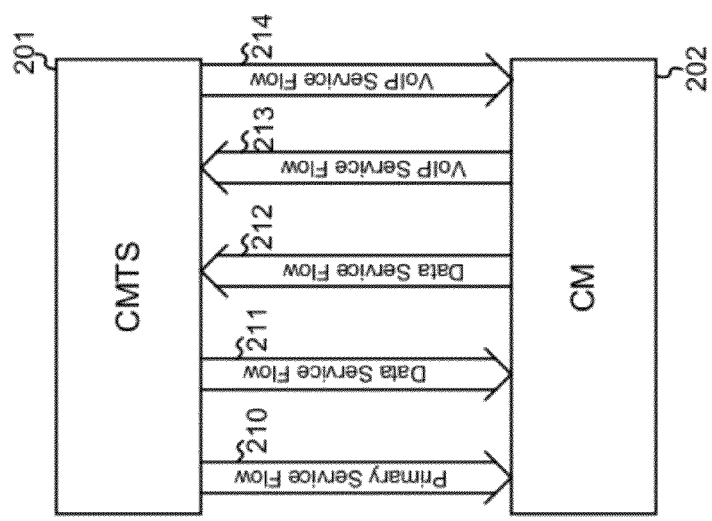
FIG. 2 is a diagram illustrating the concept of a service flow.

FIG. 2 is a diagram illustrating the concept of service flows in additional detail. A CMTS 201 communicates with a cable modem 202 through a number of service flows 210-214. Primary service flow 210 is the first service flow established between CMTS 201 and cable modem 202. Additional service flows, such as data service flows 211 and 212, and VoIP service flows 213 and 214, may later be established between CMTS 201 and cable modem 202. Each of service flows 210-214 is associated with a QoS level and service flow ID that is used to identify that service flow. The QoS levels may dictate, for example, that service flows 210 and 213-214 are given a higher priority by CMTS 201 than service flows 211 and 212. Accordingly, if resources of CMTS 140 or the bandwidth of cable network 130 begin to become overburdened, CMTS 140 may throttle back service for the service flows that have a lower QoS level (i.e., service flows 211 and 212).

Ordered Switchover at CMTS

Figure 3:
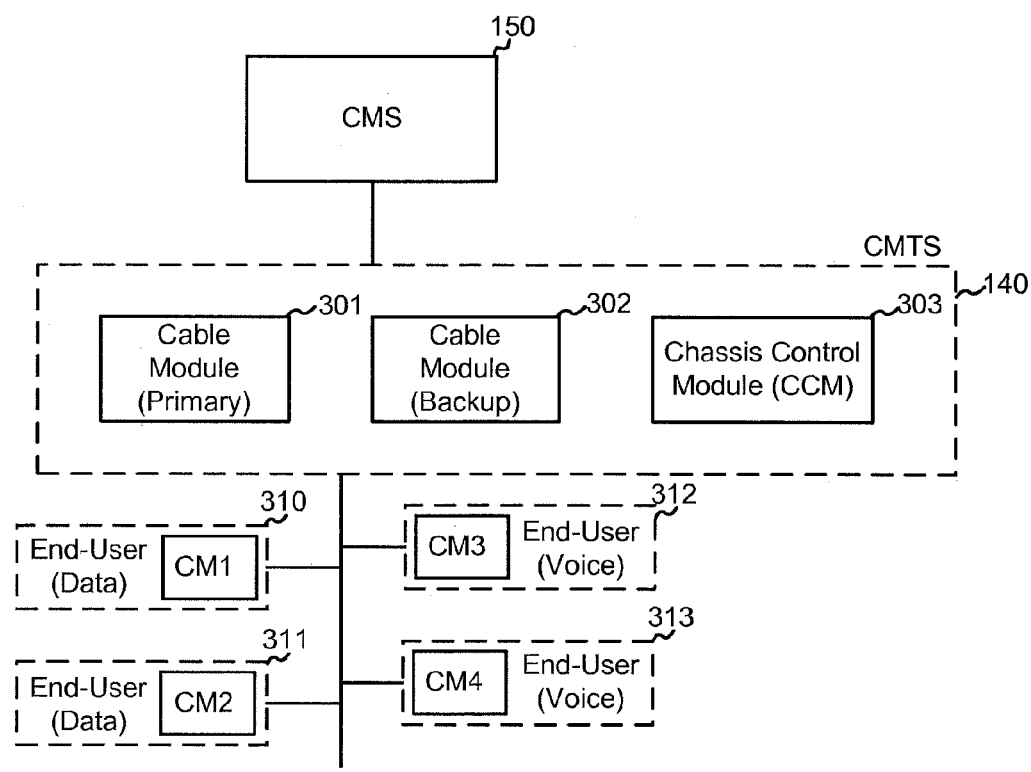
FIG. 3 is a diagram illustrating a cable modem termination system (CMTS) shown in FIG. 1 in additional detail.

FIG. 3 is a diagram illustrating CMTS 140 in additional detail. CMTS 140 may include a number of removable modules, each of which can service a number of cable modems. Two removable modules, cable modem module 301 and cable modem module 302, are illustrated in FIG. 3. Modules 301 and 302 may service end-users 310-313. Each of end-users 310-313 may include a cable modem (CM) that allows the end-user to communicate with CMTS 140 via a data connection or a voice connection (or both). In the exemplary illustration, end-users 310 and 311 represent data connections and end-users 312 and 313 represent voice connections. End-users 310-313 may be configured in a similar manner as end-users 110 illustrated in FIG. 1.

Module 301 may be a primary module for end-users 310-313 and module 302 may be a backup module for these end-users. In normal operation, primary module 301 services end-users 310-313. If primary module 301 fails, however, backup module 302 may take over communications with end-users 310-313. Backup module 302 takes over communications with end-users 310-313 by re-establishing the service flow with the cable modems associated with the end-users.

CMTS 140 may additionally include a chassis control module (CCM) 303. CCM 303 may store state information relating to the service flows 210-214. When primary module 301 fails, the state information in CCM 303 is transferred to backup module 302, which the backup module uses in re-establishing connections with the cable modems.

Figure 4:
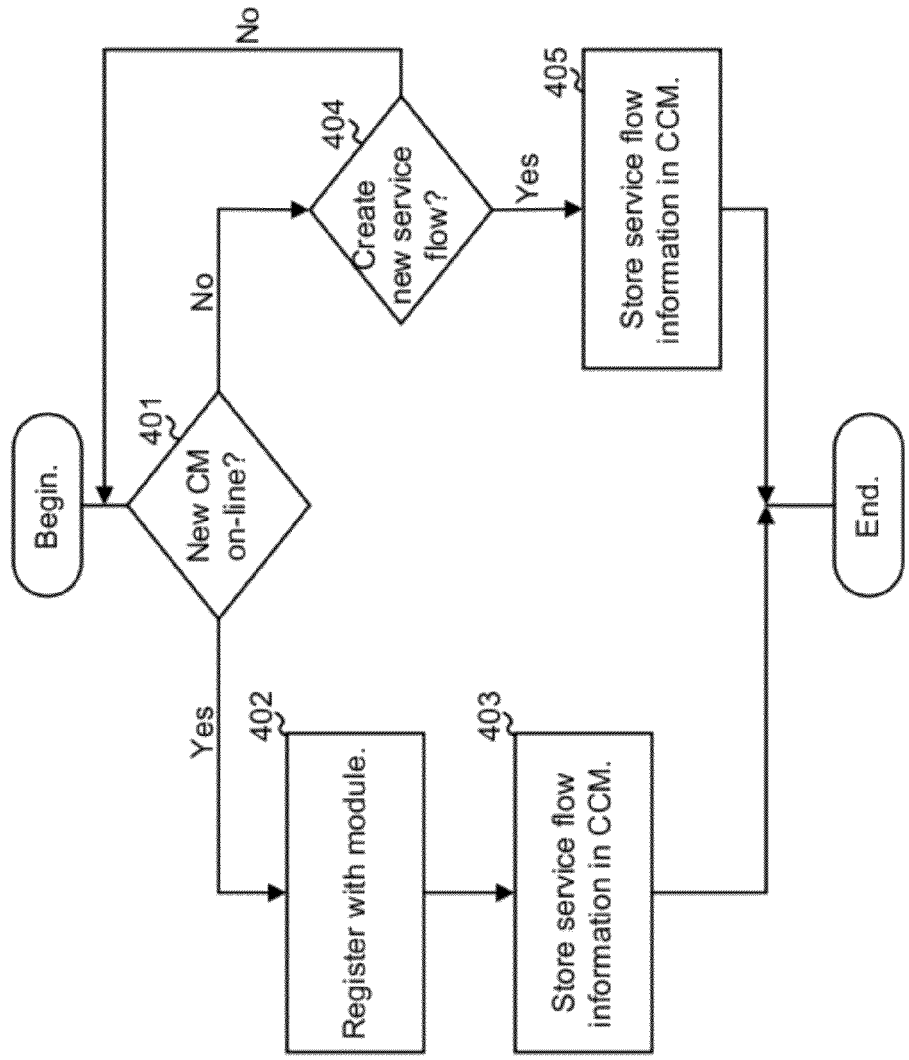
FIG. 4 is a flow chart illustrating creation of new service flows between a CMTS module and a cable modem.

FIG. 4 is a flow chart illustrating creation of new service flows between a CMTS module, such as primary module 301, and a cable modem. When a new cable modem comes on-line, such as when the cable modem is first turned on by the user, the cable modem registers with module 301 (Acts 401 and 402). The registration process includes identifying the cable modem and creating a primary service flow with the cable modem. Every cable modem includes a unique identification number that is installed in the cable modem at manufacture. The CMTS 140 may use this identification number to validate the cable modem and to then create the primary service flow with the cable modem.

As previously mentioned, service flows are associated with service flow IDs. After creating the primary service flow, module 301 may store information relating to the service flow in CCM 303 (Act 403). The stored information may include, for example, the service flow ID, the identification number of the cable modem, and a session class associated with the service flow. Consistent with an aspect of the invention, the session class associated with the service flow may be based on factors such as the QoS required for the service flow or the type of the service flow. For example, a set of possible session classes may include: "primary", "911", "VoIP", and "data". In this example, the "primary" class refers to service flows that are primary service flows; the "911" session class refers to VoIP calls that are placed to emergency numbers; the "VoIP" class refers to other, non-emergency VoIP calls; and the "data" session class refers to data session connections.

Even when there are no new cable modems coming on-line, module 301 may still create new service flows. When a user initiates a VoIP call for instance, CMS 150 may instruct CMTS 140 to initiate a new service flow for the call. Accordingly, if there are any new service flows to create, module 301 will create the service flow with the cable modem and store information identifying the service flow in CCM 303 (Acts 404 and 405). In this manner, new service flows, when added, are stored in CCM 303. Although not shown, module 301 may additionally delete service flows from CCM 303 when the service flow is finished.

Figure 5:
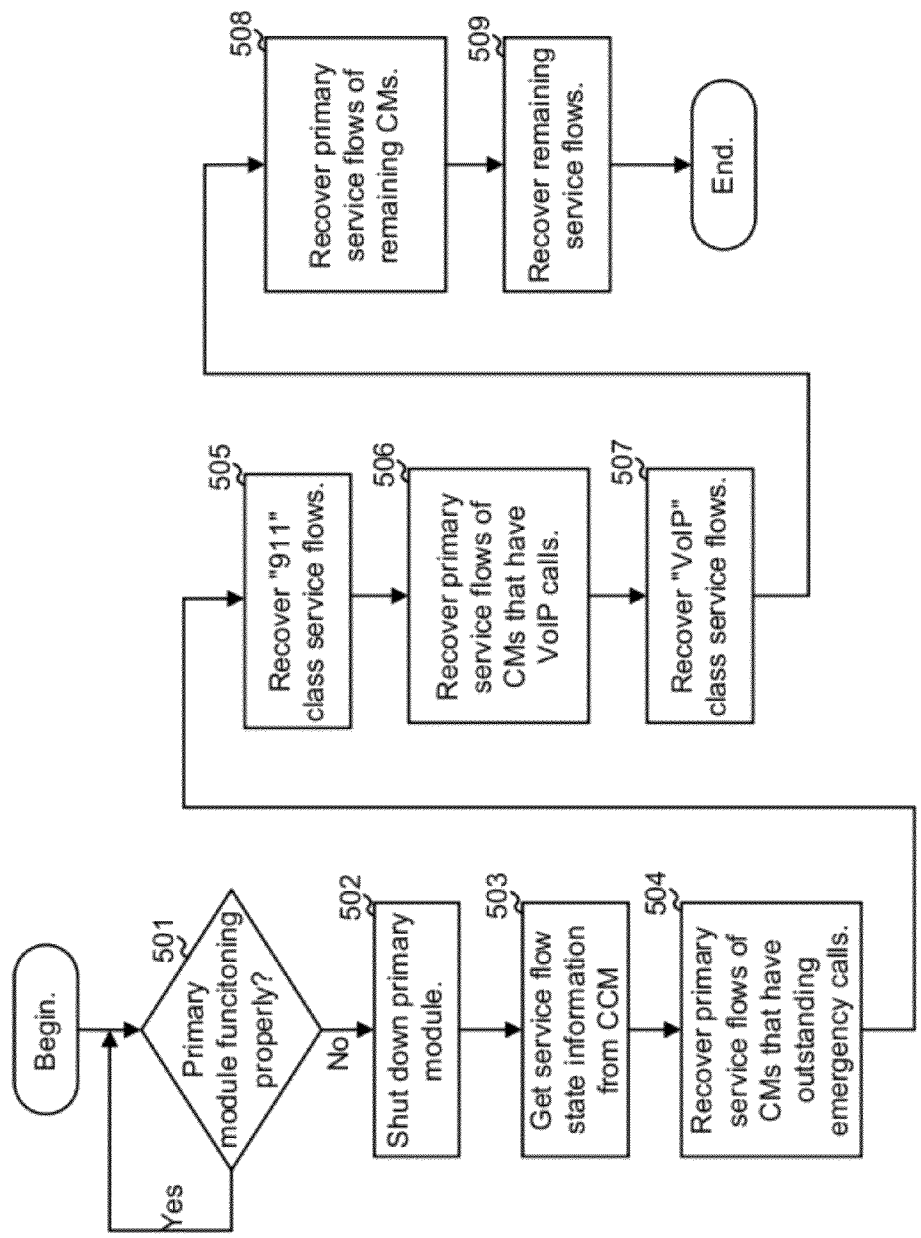
FIG. 5 is a flow chart illustrating module switchover in a CMTS when one of the modules in the CMTS fails.

FIG. 5 is a flow chart illustrating module switchover in CMTS 140 when one of the modules, such as primary module 301, fails. In this example, backup module 302 is configured to take over processing for module 301 when module 301 fails.

Backup module 302 may monitor module 301 to ensure that module 301 is functioning properly. When module 301 fails, module 302 may shut down module 301 (Acts 501 and 502). This may include assuming responsibility for all the communication functions of module 301. Module 302 may get the service flow state information for module 301 from CCM 303 (Act 503). Alternatively, instead of reading the service flow state information from CCM 303 after module 301 fails, module 302 may continuously read-in or otherwise monitor the service flow state information stored in CCM 303. In this implementation, module 302 may always have a current version of the state information and thus would not have to spend time retrieving it from CCM 303.

Module 302 may next begin to bring back the service flows associated with the cable modems that were previously being serviced by module 301. Consistent with an aspect of the invention, module 302 recovers the service flows in an order determined by the service flow class information. The order is shown in detail in Acts 504-509.

Module 302 begins by recovering the primary service flows of the cable modems that have outstanding emergency calls (Act 504). Thus, if one of the stored service flows is of class "911," module 302 will first recover the primary service flow of this cable modem. Module 302 next recovers the "911" class service flows for which the primary service flows were just recovered (Act 505).

Module 302 may then begin to recover any primary service flows that correspond to cable modems that were not recovered in Act 504 and that have outstanding VoIP calls (Act 506). Module 302 then recovers the service flows of the "VoIP" class (Act 507). Module 302 may then begin to recover any primary service flows that correspond to cable modems that were not recovered in Acts 504 or 506 (Act 508). Module 302 then recovers the remaining service flows for all the cable modems (Act 509). These service flows will correspond to the lower-priority "data" class service flows.

Example Processing

As an example of the Acts shown in FIG. 5, consider the situation shown in FIG. 3, in which four cable modems, labeled as CM1-CM4, are associated with end-users 310-313. Assume that all four cable modems are turned on and registered with module 301 of CMTS 140. Further, assume that end-user 312, corresponding to CM3, dials an emergency "911" number for a VoIP call. At this point, CMS 150 may instruct CMTS 140 to set up a new voice service flow to CM3. Module 301 may establish this service flow and store its identification information in CCM 303.

If module 301 were to fail, module 302 recovers the service flow information for the four cable modems from CCM 303. Module 302 would then first recover the primary service flow of CM3 because the user of CM3 is engaged in an emergency call, even through the primary service flow of CM3 and/or the service flow corresponding to the emergency call may have been one of the last service flows registered. Module 302 would then recover the service flow corresponding to the emergency call in CCM 303. Module 302 may then recover the primary service flow and the voice service flows of CM4 before finally recovering the service flows of CM1 and CM2. The service flows of cable modems CM1 and CM2 are recovered last because they correspond to data service flows that are more tolerant of temporal service disruptions.

Conclusion

As described above, a CMTS includes modules for interfacing with cable modems. When one of the modules fails, a backup module may take over service to the cable modems with minimal service disruptions. In particular, the backup module restores service flows between the module and the cable modems based on a priority order determined from QoS requirements of the various service flows. Emergency voice sessions are restored first, followed by regular voice sessions, followed by data sessions.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

Moreover, while a series of acts has been presented with respect to FIGS. 4 and 5, the order of the acts may be different in other implementations consistent with principles of the invention. In particular, non-dependent acts may be implemented in parallel. Additionally, lines with arrows are used in the figures to generally illustrate the flow of data. In practice, embodiments consistent with the principles of the invention may send data on these lines in both directions.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed:

1. A system comprising:
a cable modem termination system (CMTS) comprising:
    a first module to communicate with one or more cable modems using a plurality of service flows,
    a second module to store information identifying the plurality of service flows, and
    a third module to:
        establish communication with the one or more cable modems, when the first module fails, and
        restore two or more of the plurality of service flows using the stored information,
        the two or more of the plurality of service flows including:
            a primary service flow of a cable modem, of the one or more cable modems, and
            a voice over Internet Protocol (VoIP) service flow of the one or more cable modems,
        the primary service flow being used to transmit maintenance and control information,
        the third module restoring the primary service flow before restoring the VoIP service flow of the one or more cable modems.

2. The system of claim 1, where a portion of the stored information, associated with at least one service flow of the two or more of the plurality of service flows, comprises one or more of:
    service flow identification information, cable modem identification information, or session class information.

3. The system of claim 2, where the third module restores service flows based on an order, and
    where the order is based on the session class information.

4. The system of claim 2, where the session class information is based on a quality of service associated with the at least one service flow.

5. The system of claim 1, where the two or more of the plurality of service flows further include one or more VoIP service flows and one or more data service flows, and where a primary service flow associated with a VoIP service flow, of the one or more VoIP service flows, is restored before a primary service flow associated with a data service flow of the one or more data service flows.

6. The system of claim 1, where first module is further to:
create a service flow for a call,
store information associated with the created service flow in the second module, and
delete the service flow when the call is completed.

7. A method comprising:
communicating, using a first module of a network device, with a plurality of cable modems through a plurality of service flows established with the plurality of cable modems;
storing, using a second module of the network device, information identifying the plurality of service flows;
communicating, using a third module of the network device, with the plurality of cable modems when the first module fails; and
restoring, using the third module, service flows of the plurality of service flows associated with the failed first module that are identified by the stored information,
restoring the service flows including:
    first restoring a primary service flow for a cable modem, of the plurality of cable modems, having one or more outstanding emergency calls,
    the primary service flow being used to transmit maintenance and control information.

8. The method of claim 7, where the stored information comprises one or more of:
    service flow identification information, cable modem identification information, or session class information.

9. The method of claim 7, where restoring the service flows is performed in an order that is based on a quality of service associated with at least one of the service flows.

10. The method of claim 7, where restoring the service flows further includes:
    reading the stored information, from the second module, after the failure of the first module is detected; and
    restoring the service flows based on reading the stored information.

11. The method of claim 7, where at least one of the first module or the third module is associated with a data over cable service interface specification (DOCSIS) module.

12. A system comprising:
a device to:
    establish service flows between one or more cable modems and a first module of a cable modem termination system (CTMS);
    store information associated with the established service flows in a second module of the CTMS; and
    restore service flows, of the established service flows, that failed due to a failure of the first module, between the one or more cable modems and a third module of the CTMS, the failed service flows being restored by using the stored information from the second module to determine one or more of the failed service flows to restore,
    when restoring the service flows, the device is to:
        first restore a primary service flow, of the failed service flows, for a cable modem, of the one or more cable modems, that has one or more outstanding emergency calls,
        the restored primary service flow being used to transmit maintenance and control information.

13. The system of claim 12, where the failed service flows are restored based on session class information associated with the failed service flows.

14. The system of claim 12, where the device is further to:
access the stored information in the second module prior to and after the failure of the first module.

15. The system of claim 12, where the device is further to:
detect the failure of the first module,
where the service flows are restored based on the detected failure of the first module.

16. The system of claim 12, where the device is further to:
create a service flow using the first module,
store information associated with the created service flow in the second module, and
delete the information associated the service flow when the service flow is completed.

17. The system of claim 12, where the device is further to:
restore a primary service flow of the failed service flows that is associated with a voice over Internet Protocol (VoIP) call prior to restoring a primary service flow of the service flows that is associated with a data session.

18. A method comprising:
communicating, using a first module of a network device, with one or more cable modems through a plurality of service flows established with the one or more cable modems;
storing, using a second module of the network device, information identifying the plurality of service flows;
communicating, using a third module of the network device, with the one or more cable modems when the first module fails; and
restoring, using the third module, two or more of the plurality of service flows associated with the failed first module that are identified by the stored information,
restoring the two or more of the plurality of service flows includes:
restoring a primary service flow of the two or more of the plurality of service flows before restoring a service flow, of the two or more the plurality of service flows, that is associated with a voice over Internet Protocol (VoIP) session class,
the primary service flow being used to transmit maintenance and control information.

19. The method of claim 18, where restoring the two or more of the plurality of service flows further includes:
restoring the two or more of the plurality of service flows in an order that is based on a quality of service associated with at least one of the two or more of the plurality of service flows.

20. The method of claim 18, where another primary service flow, of the two or more of the plurality of service flows, that has an outstanding emergency call, is restored before the primary service flow.

* * * * *